United States Patent [19]
Anahara et al.

[11] Patent Number: 5,454,845
[45] Date of Patent: Oct. 3, 1995

[54] HEAT-RESISTANT FILTER

[75] Inventors: Meiji Anahara; Makoto Tsuzuki; Ryuta Kamiya; Hiroshi Matsuura; Yoshiharu Yasui, all of Kariya, Japan

[73] Assignee: Kabushiki Kaisha Toyoda Jidoshokki Seisakusho, Kariya, Japan

[21] Appl. No.: 244,337

[22] PCT Filed: Sep. 21, 1993

[86] PCT No.: PCT/JP93/01351

§ 371 Date: May 24, 1994

§ 102(e) Date: May 24, 1994

[87] PCT Pub. No.: WO94/07588

PCT Pub. Date: Apr. 14, 1994

[30] Foreign Application Priority Data

Sep. 25, 1992 [JP] Japan .................................. 4-256924
Oct. 5, 1992 [JP] Japan .................................. 4-266366

[51] Int. Cl.⁶ .......................... B01D 29/05; B01D 29/62; B01D 35/18
[52] U.S. Cl. .................. 55/267; 55/485; 55/487; 55/523; 55/527; 55/DIG. 10; 55/DIG. 30
[58] Field of Search ............... 55/269, 485–487, 55/523, 527, 267, DIG. 10, DIG. 30

[56] References Cited

U.S. PATENT DOCUMENTS

| | | | |
|---|---|---|---|
| 3,147,097 | 9/1964 | Aguas | 55/486 X |
| 3,802,429 | 4/1974 | Bird | 55/527 X |
| 3,960,509 | 6/1976 | Abriany | 55/DIG. 30 |
| 4,205,971 | 6/1980 | Abthoff et al. | 55/DIG. 30 |
| 4,255,173 | 3/1981 | Mayer et al. | 55/DIG. 30 |
| 4,257,791 | 3/1981 | Wald | 55/487 X |
| 4,522,876 | 6/1985 | Hiers | 55/486 X |
| 4,535,589 | 8/1985 | Yoshida et al. | 55/DIG. 10 |
| 4,544,388 | 10/1985 | Rao et al. | 55/DIG. 10 |
| 4,548,625 | 10/1985 | Ishida et al. | 55/DIG. 10 |
| 4,686,827 | 8/1987 | Wade et al. | 55/DIG. 30 |
| 4,838,903 | 6/1989 | Thomaides et al. | 55/486 X |
| 4,948,398 | 8/1990 | Thomaides et al. | 55/527 X |
| 5,171,341 | 12/1992 | Merry | 55/DIG. 30 |
| 5,224,973 | 7/1993 | Hoppenstedt et al. | 55/DIG. 10 |
| 5,228,891 | 7/1993 | Adiletta | 55/523 X |
| 5,248,481 | 9/1993 | Bloom et al. | 55/DIG. 10 |
| 5,248,482 | 9/1993 | Bloom | 55/DIG. 10 |
| 5,250,094 | 10/1993 | Chung et al. | 55/527 X |
| 5,298,046 | 3/1994 | Peisert | 55/DIG. 30 |

FOREIGN PATENT DOCUMENTS 3017784  11/1981  Germany .................... 55/DIG. 30

*Primary Examiner*—Robert Spitzer
*Attorney, Agent, or Firm*—Brooks Haidt Haffner & Delahunty

[57] ABSTRACT

The present invention relates to a heat-resistant filter which is suitable for trapping particulate contained in a high temperature exhaust gas from an engine, and can be reconditioned by removing with burning the trapped particulate. This invention aims at providing a heat-resistant filter, which will suppress a rise in back pressure to a small amount even when exhaust gas processing is executed for a long period of time, will not cause problems in removing deposits through heating and burning by an electrical heat-generating member, and can endure corrosive action under a high-temperature acidic atmosphere. A filter layer having heat-resistant fibers laminated at random is provided between two airpermeable partitions, the first of which is disposed upstream in the direction of a fluid flow to be filtered and is formed of a planar fabric made of non-conductive heat-resistant fibers.

20 Claims, 10 Drawing Sheets

HEAT-RESISTANT FILTER

TECHNICAL FIELD

This invention relates to a heat-resistant filter, and more particularly, to a heat-resistant filter having improved durability, which is suitable for collecting particulate contained in a high-temperature exhaust gas from an engine, and will eliminate the particulates with burning, resulting in less damage to a filter material.

BACKGROUND ART

As a filter device for removing particulate contained in an exhaust gas from a diesel engine, various devices have been proposed conventionally. For instance, U.S. Pat. No. 4,205,971 discloses a device. The device has a ceramic fiber material provided in a cylindrical form in a cylindrical filter case which is disposed close to an exhaust port of internal combustion engine. The ceramic fiber includes a loose ceramic fiber pad as an outer layer and a woven inner ceramic fiber mat. A cavity entending in the axial direction is connected to an exhaust conduit. The exhaust port of the engine is connected to an inlet connecting pipe of the filter case. The ceramic fiber material is supported at its radial interior and exterior by metal perforated plates as needed. A woven metal wire may be provided between the inner ceramic fiber mat and the inner perforated plate.

As the outside fibers in the ceramic fiber pad of this filter are entangled loosely and has poor bonding, the fiber arrangement is disturbed when the exhaust gas directly hits the fibers, thus causing an early reduction of the particulate-collecting function.

Further, since this filter uses super-heated soot particles present in the exhaust gas as an ignition source for burning soot caught by the ceramic fiber material, the filter apparatus should be disposed close to the exhaust port. Generally, however, it is difficult to obtain a large space for the filter apparatus in the vicinity of the engine. While the burning of carbon deposit requires that the temperature be kept at 600° C. or higher for a predetermined time period, the temperature of the exhaust gas varies greatly based on the running conditions of an automobile. Accordingly, it is very difficult to keep such condition. This rises the undesirable back pressure due to incomplete combustion.

Japanese Unexamined Patent Publication No. Hei 2-256812 discloses a filter apparatus which has a plurality of layers of ceramic fiber filter materials and electric heating elements (heaters) alternately wound around an air-permeable support member (metal cylinder having many holes formed therein). In this apparatus, gaps of various sizes extending radially with respect to the air-permeable support member are formed by the ceramic fiber filter material, and when the exhaust gas from the diesel engine passes therethrough, the particulates in the exhaust gas are caught close to the heaters. When the heaters are energized, the captured particulate will be burned efficiently.

At the time of heat generation caused by energizing the heaters to burn the deposits, the vicinity of the burning portion is heated to 1000° C. or higher. The heaters and the ceramic fibers have different coefficients of thermal expansion. Accordingly, the difference between the amount of expansion of the heaters and that of the ceramic fibers becomes too large to be negligible, for instance, when canthal lines (cermet materials which are used as heating members for generating a temperature of up to 1800° C. and are produced by Canthal Gaderius Co., Ltd.) has its coefficient of thermal expansion which is substantially twice as much as that of ceramic. Therefore, for those lines of a length of 300 mm, for example, a deviation of 2 mm would occur in the range between 1000° C. and the normal temperature. Since many layers of the heaters and ceramic fibers are alternately laminated close to one another in the above conventional apparatus, sliding friction occurs therebetween at the time of heat generation caused by energizing the heaters. Accordingly, the ceramic fibers susceptible to friction are liable to be broken or damaged, so that its durability appears poor.

As the heaters are sealed in the ceramic fibers in the conventional apparatus, the temperatures of the heat generating portion and its environmental portion which is in direct contact with the heat generating portion excessively rise, so that the temperature gradient becomes large due to the additional burning heat of deposits accumulated around there. Consequently, not only the ceramic fibers but also the heaters may be damaged by the friction originating from the difference in the coefficient of thermal expansion and the locally high temperature. In the case where either the heaters or ceramic fibers are damaged for some reason and need replacing, it would take time for disassembling or the like to replace only either one while the replacement of the entire unit would result in replacement of the undamaged one, requiring an extra cost.

It is a primary object of the present invention to provide a heat-resistant filter, which will suppress a rise in back pressure to a small amount even when exhaust gas processing is executed for a long time period, will not raise a problem in removing deposits through heating and burning by an electrical heat-generating member, and can endure a corrosive action under a high-temperature acidic atmosphere.

It is a second object to provide a heat-resistant filter, which, in addition to the above object, is very easy to handle, ensures easy reproduction of the filter, ensures automatic and continuous, stable burning and reproduction of deposits without an operation by a driver during driving of an automobile, and, when either one of an electrical heat-generating member or a filter body constituting the filter needs replacing, allows for simple replacement of only the one that should be replaced.

DISCLOSURE OF THE INVENTION

To achieve the first object, according to this invention, a heat-resistant filter provided between air-permeable partitions has a filter layer. The filter layer has heat resistant fibers laminated at random. The first air-permeable partition of both partitions disposed upstream in a passing direction of a fluid to be filtered is formed of a planar fabric made of non-conductive heat-resistant fibers. As the first air-permeable partition includes a planar fabric made of non-conductive heat-resistant fibers. The first air-permeable partition is disposed upstream in the passing direction of the fluid to be filtered. The disturbance of the entanglement of the fibers constituting the filter layer will be suppressed even when the flow of an exhaust gas is swift. As a result, particulate will be caught and deposited in gaps formed by multi-level crossing of the random-laminated heat-resistant fibers such as ceramic fibers, ensuring filtering effect for a long time. Both air-permeable partitions may be formed in a tube shape and arranged concentric to each other. In this case, the shape retaining performance is improved as compared with the case of the flat shape.

To achieve the second object, the first air-permeable partition of the above-described heat-resistant filter is disposed on the most upstream side in the passing direction of the fluid to be filtered, constituting a filter body. An electrical heat-generating member is non-integrally disposed close to the first air-permeable partition of the filter body and along the surface of the first air-permeable partition. When some amount of particulate are caught in the filter layer, the electrical heat-generating member is energized, the generated heat starts the burning of the deposits, and the deposits are burned by the heat generated by the electrical heat-generating member and the burning heat of the deposits. At the time the deposits are burned, the electrical heat-generating member and the heat-resistant fibers constituting the first air-permeable partition move relative to each other due to the difference between the coefficient of thermal expansion of the electrical heat-generating member and that of those heat-resistant fibers. As the electrical heat-generating member is disposed non-integrally along the surface of the first air-permeable partition, the heat-resistant fibers will not be stretched or rubbed hard by the electrical heat generating member and both move relative to each other, thus preventing the heat-resistant fibers from being damaged. When the filter body or the electrical heat generating member needs replacing, the filter body can easily be separated from the electrical heat-generating member, thus permitting only the one that needs replacing to be easily replaced. Since the first air-permeable partition is formed of a planar fabric made of non-conductive heat-resistant fibers, even if the electrical heat-generating member contacts the first air-permeable partition, there is not a chance of causing an inconvenience such as a short-circuit oriented accident.

Further, even if the first air-permeable partition is exposed to a strongly acidic atmosphere caused by sulfuric acid in the exhaust gas at a high temperature of about 1000° C. at the time of the reproduction of the filter body, the first air-permeable partition will endure the corrosive action.

The filter body may be cylindrical and the first air-permeable partition may be disposed inside the filter body. It is preferable that the filter body be formed in a shape of rectangular tube. In this case, the ratio of the filter area to the volume of the filter unit increases, so that a filter apparatus having a plurality of filter units having the same collecting performance will be made compact. It is desirable that the second air-permeable partition of the filter body be a woven metal wire. A porous plate may be disposed downstream of the second air-permeable partition with respect to the fluid stream. A cover tube may be arranged outside the filter with a predetermined distance from the filter body.

BEST MODE FOR CARRYING OUT THE INVENTION

The present invention will now be described below in detail referring to the accompanying drawings.

(Embodiment 1)

Figure 1:
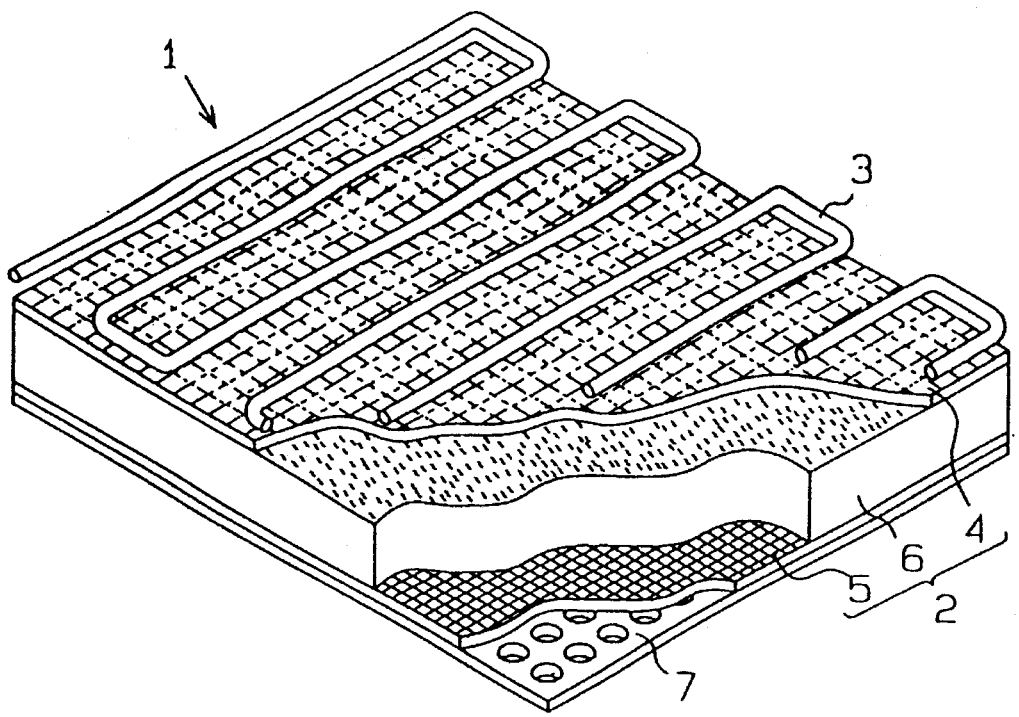
FIG. 1 is a schematic perspective view of a flat filter according to a first embodiment.

A flat exhaust gas filter according to a first embodiment of the present invention will be described with reference to FIGS. 1 and 2. As shown in FIG. 1, a flat filter 1 comprises a filter body 2 and a heater 3 as an electrical heat-generating member. The filter body 2 is formed in a sandwich form in that a filter layer 6 having heat-resistant fibers stacked at random is sandwiched between a first air-permeable partition 4 and a second air-permeable partition 5. A stainless steel porous plate 7 is arranged outside the second air-permeable partition 5.

The first air-permeable partition 4 is disposed upstream in the passing direction of an exhaust gas that is to be filtered by the flat filter 1, and comprises a planar fabric having non-conductive heat-resistant fibers organized at a proper density. As the non-conductive heat-resistant fibers, ceramic long fibers, such as silicon carbide fibers, alumina fibers, tilano fibers (produced by Ube Industries Ltd.: trade name), etc. are used. The second air-permeable partition 5 is formed of a woven metal wire. Canthal lines excellent in high temperature durability are used as a material for the heater 3. The heater 3 is disposed in a non-integral manner with the first air-permeable partition 4.

The phrase "non-integral manner" means that a state where the first air-permeable partition 4 and the heater 3 are in contact with or close to each other, and, what is more, their relative movement is carried out smoothly. That is, it is not limited to the state of the heater 3 and the first air-permeable partition 4 fully separated, but includes the case where a part of the heater 3 is in contact with the first air-permeable partition 4 or where the entire heater 3 is in light contact with the first air-permeable partition 4. In this embodiment, the heater 3 is disposed in a zigzag fashion along the surface of the first air-permeable partition 4 with a slight clearance therebetween. As the coefficient of thermal expansion of the first air-permeable partition 4 is considerably smaller than that of the heater 3, the first air-permeable partition 4 cannot follow up the expansion/contraction of the heater 3 at the time the temperature rises or falls so that both move relative to each other, but this relative movement is smoothly done. As the heater 3 is disposed in a non-integral manner with respect to the filter body 2, when the heater 3 or the filter body 2 needs replacing, only the one that needs replacing can easily be replaced.

As the filter layer 6 having heat-resistant fibers stacked at random, there is a non-woven fabric comprising ceramic short fibers. An example of this non-woven fabric has ceramic short fibers entangled by a needle punch system. While the needle punch system is adapted without problems for ordinary fibers that are flexible and easy to bend, its effect is poor on fibers such as ceramic fibers which do not stretch much and are brittle. If the exhaust gas hits the filter layer 6 directly with the fibers entangled weakly, the fiber distribution of the filter layer 6 is disturbed, rapidly reducing the catching performance. With ceramic short fibers bonded together by an adhesive, because there is no bonding agent having heat resistance matching the resistible temperature of the ceramic fibers, the performance of this bonded structure, once subjected to a heat treatment at high temperatures, is reduced considerably.

Therefore, the first air-permeable partition 4 needs the function as a protective member whose fabric structure will not be disturbed by the flow of a hot exhaust gas and prevent the fiber arrangement of the non-woven fabric constituting the next layer, the filter layer 6, from being disturbed for a long period of time by the strong current of the exhaust gas.

As the deposits caught by the filter body 2 have a strong tendency to remain around the surface of the filter member, the heater 3 should be disposed upstream in the passing direction of the fluid to be filtered in order to efficiently burn the deposits by the heat generated by the heater 3 attached to the filter body 2. Since the heater 3 is in contact with the first air-permeable partition 4 or is close to the first air-permeable partition 4 if fully spaced away therefrom, the heater 3 comes closer to or in closer contact with the first air-permeable partition 4 due to the thermal expansion at the time of heat generation. If the first air-permeable partition 4 is formed of a conductive material, such as metal, short-circuiting may occur through the first air-permeable partition 4 at the time the heater 3 is energized, resulting in a critical accident and causing an abnormal current to flow in the peripheral conductive members. In this respect, the first air-permeable partition 4 should be non-conductive. At the time deposited particulate are burned, the first air-permeable partition 4 is not only exposed to such high temperatures as 1000° C. but is also subjected to strong sulfuric acid corrosion by a sulfur component contained in the exhaust gas.

As a partition material which is non-conductive and has an acid resistance in a high-temperature atmosphere, there is a planar fabric, such as a woven fabric, knitting or plait (braiding), made of bundles of yarns consisting of heat-resistant fibers like ceramic fibers. The planar fabric is demanded of some precision so that it does not adversely affect a rise of the back pressure and does not disturb the fiber distribution of the non-woven fabric located downstream. In general, knitting and plaiting both damage brittle heat-resistant fibers when made into a tight fabric, and are very difficult to handle. On the contrary, the handleability of a woven fabric will be improved considerably by protecting bundles of yarns with coating provided by a gluing treatment, etc. Further, if the first air-permeable partition 4 is made of a three-dimensional fabric, a fine and stably-shaped fabric having bundles of fibers laminated one on another would be obtained and this fabric is used suitably for the aforementioned objectives.

The three-dimensional fabric should not necessarily have a multi-layer structure, but may have a simple two- or three-layer structure. When a ceramic fiber fabric is used as the first air-permeable partition 4, as described above, a part of the particulate in the exhaust gas is caught by the first air-permeable partition 4.

The second air-permeable partition 5 is demanded to have a function to preserve the structure of the filter layer 6 in cooperation with the first air-permeable partition 4 and prevent short fibers, coming off from the filter layer 6, from scattering. As the particulate in the exhaust gas are caught by the first air-permeable partition 4 and the filter layer 6, the second air-permeable partition 5 should not necessarily catch them. Further, since the second air-permeable partition 5 is placed away from the heater 3 with the first air-permeable partition 4 and filter layer 6 intervening as a heat insulator between the partition 5 and the heater 3, the elevating temperature is considerably lower than that of the first layer when the deposited particulates are burned. Accordingly, since heat resistance and acid resistance of the ceramic fibers are not necessary, a woven metal wire formed of a thin metal such as stainless steel wire of small diameter would exhibit a sufficient performance.

If a small amount of deposited particulate is frequently burned to suppress the amount of burning heat per burning or the filter layer 6 is made thick to provide a sufficient heat insulating effect, a planar fabric of glass fibers may be used as the second air-permeable partition 5. In this case, it is preferable that glass fibers of a heat-resistant grade be used as needed.

Figure 2:
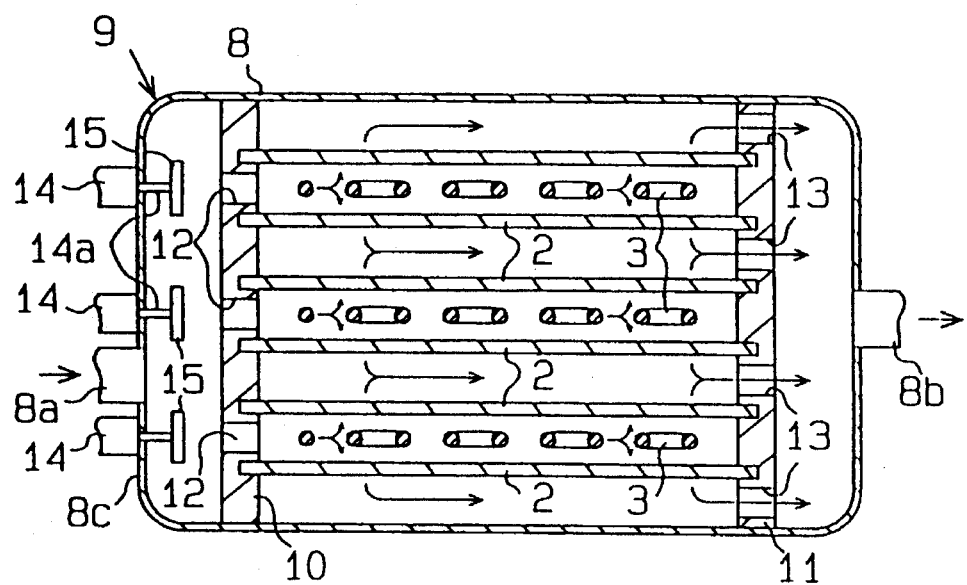
FIG. 2 is a schematic cross-sectional view of a filter apparatus having a multiplicity of the flat filters.

As illustrated in FIG. 2, the filter bodies 2 are disposed in six layers in a metal housing 8, with a single heater 3 provided for each pair of adjoining layers, thereby constituting a filter apparatus 9. Each filter body 2 was manufactured by using the following materials for the first air-permeable partition 4, filter layer 6 and second air-permeable partition 5.

The first air-permeable partition 4: a plain weave obtained by weaving warps and wefts of filaments of 10 μm φ×2000 made of Altex (trade name of alumina fibers produced by Sumitomo Chemical Company, Limited) fibers.

The filter layer 6: Kaowool (trade name from Isolite Industries Ltd.) which is a non-woven fabric made of ceramic fibers by a needle punch system.

The second air-permeable partition 5: woven metal wire having stainless steel wires made into a plain fabric (mesh size of about 100 μm).

The housing 8 is formed in a rectangular tube. A pair of rectangular partitions 10 and 11 are secured inside the housing 8 in a direction perpendicular to the flow of the exhaust gas, with their peripheral surfaces fitted in the inner wall of the housing 8. Three holes 12 are formed at given intervals in the partition 10 located on the side of an inlet 8a. Four holes 13 are formed at equal intervals in the partition 11 located on the side of an outlet 8b, with a phase shift with respect to the positions of the holes 12.

The two filter bodies 2 in each pair are arranged between the partition pair 10 and 11 with a predetermined interval (about 10 mm) in such a way that the first air-permeable partitions 4 face each other and the first air-permeable partition 4 sides face the exhaust gas flowing through the associated hole 12. Both sides of each flat filter 1 are secured in close contact to the inner wall of the housing 8. As the ceramic fiber members constituting the filter have a lower coefficient of thermal expansion than the metal therearound, the amount of expansion with respect to a change in temperature at the time of the collection and burning of the particulate differs, thus requiring some measure to prevent breakage from excessive tension. Very simply, it is effective to provide the ceramic fiber member with a slack amount corresponding to the difference in the amount of expansion.

To prevent the heaters 3 from contacting with one another due to expansion at the time of heat generation, the heaters 3 are provided one between the facing first air-permeable partitions 4. Since the porous plate 7 is provided outside the second air-permeable partition 5, it is easy to handle at the time of assembling the filter body 2.

Actuators 14 are mounted at the positions facing the holes 12 on an inlet-side wall 8c of the housing 8. The actuator 14 is activated by negative pressure as a driving source, and a lid 15 for selectively opening and closing the hole 12 is secured to the distal end of its piston rod 14a.

In use, this filter apparatus 9 was coupled to that position of the exhaust pipe of a Diesel engine of an automobile which is set apart about 1.5 m from the engine, so that the exhaust gas would flow in through the inlet 8a side, and a battery was used as a power source for the heaters 3. The exhaust gas passes through the holes 12 to be guided to the position corresponding to the first air-permeable partition 4 of each filter body 2, and passes through each filter body 2 toward the second air-permeable partition 5 from the side of the first air-permeable partition 4. At the time the exhaust gas passes the first air-permeable partitions 4 and the filter layers 6, particulate or the like included in the exhaust gas are filtered and the purged exhaust gas passes through the holes 13 and escapes from the outlet 8b.

The particulate in the exhaust gas are caught by the filter bodies 2 due to inertial action and diffusion action. The inertial action is such that aerosol sticks on the fibers by the negative pressure which is generated by a swirl produced at the time aerosol hits against the fibers.

The diffusion action is such that when aerosol hits against the fibers, the flow rate becomes lower and aerosol is deposited on the surfaces of the fibers. The non-woven fabric constituting the filter layer 6 has a number of gaps surrounded by the fibers crossed in multi-levels. While the exhaust gas passes through the filter layer 6, therefore, the particulates collide against the fibers and are caught and accumulated in the gaps due to inertial action and diffusion action. And the filtering performance of the filter layer 6 will thereby be maintained for a long period of time.

When some amount of particulate was deposited and the back pressure rose to a level of 80 mmHg, one of the actuators 14 was activated to close the hole 12 associated with one pair of filter bodies 2 with the lid 15, and the associated heater 3 was energized. After the deposited particulate was removed by burning with the heat generated by the heater 3 (after about 1.5 minutes), the power supply to the heater 3 was stopped. The closing of the hole 12 with the lid 15 was relieved, and processing of the exhaust gas was conducted again with all the six filter bodies 2. The back pressure (about 110 mmHg), which temporarily rose when the whole exhaust gas was being processed with four filter bodies during energization, rapidly dropped when the exhaust gas processing returned to the one using all the filter bodies 2 again, ensuring an operation at a low back pressure.

At the time the particulate deposited on the filter body 2 is burned, if the flow of the exhaust gas to this filter body 2 is not restricted, there would be a considerable amount of exhaust gas passing through the filter body 2, so that most of the heat generated by the heater 3 is carried away by the current of the exhaust gas. This makes it difficult to elevate the surface temperature of the filter body 2 to about 600° C. which is necessary for burning the particulate or requires a considerable amount of power if that is possible. When in use for processing the exhaust gas of an automobile, the power source of the heater 3 is a compact battery mounted in the automobile, so that it is important to reduce the consumed power of the heater 3 as much as possible. To burn the deposited particulate, therefore, it is important to temporarily block the flow of the exhaust gas into the associated filter member. In this case, while the flow of the exhaust gas may be blocked completely, a minute amount of exhaust gas may enter.

At the time the deposited particulate is burned, the generated heat raises the filter temperature higher than the temperature of the exhaust gas, causing a local temperature rise.

As the materials for the first air-permeable partition 4 and filter layer 6 are ceramic fibers, however, they would not be damaged and withstand a thermal shock even if there is a temperature gradient. Therefore, the occurrence of troubles, such as a damage, can be reduced without strictly adjusting the burning conditions.

As the non-woven fabric constituting the filter layer 6 is formed of short fibers entangled by the needle punch system, part of the short fibers may come off during use. If the filter layer 6 is located at the most downstream side in the flow passage of the exhaust gas, the fallen short fibers would scatter together with the exhaust gas in the air. As the second air-permeable partition 5 located downstream of the filter layer 6 is constituted of a fine mesh woven metal wire, however, the movement of the fallen short fibers is stopped by the second air-permeable partition 5. That is, the second air-permeable partition 5 efficiently prevents the short fibers from scattering together with the exhaust gas in the air.

(Embodiment 2)

Figure 3:
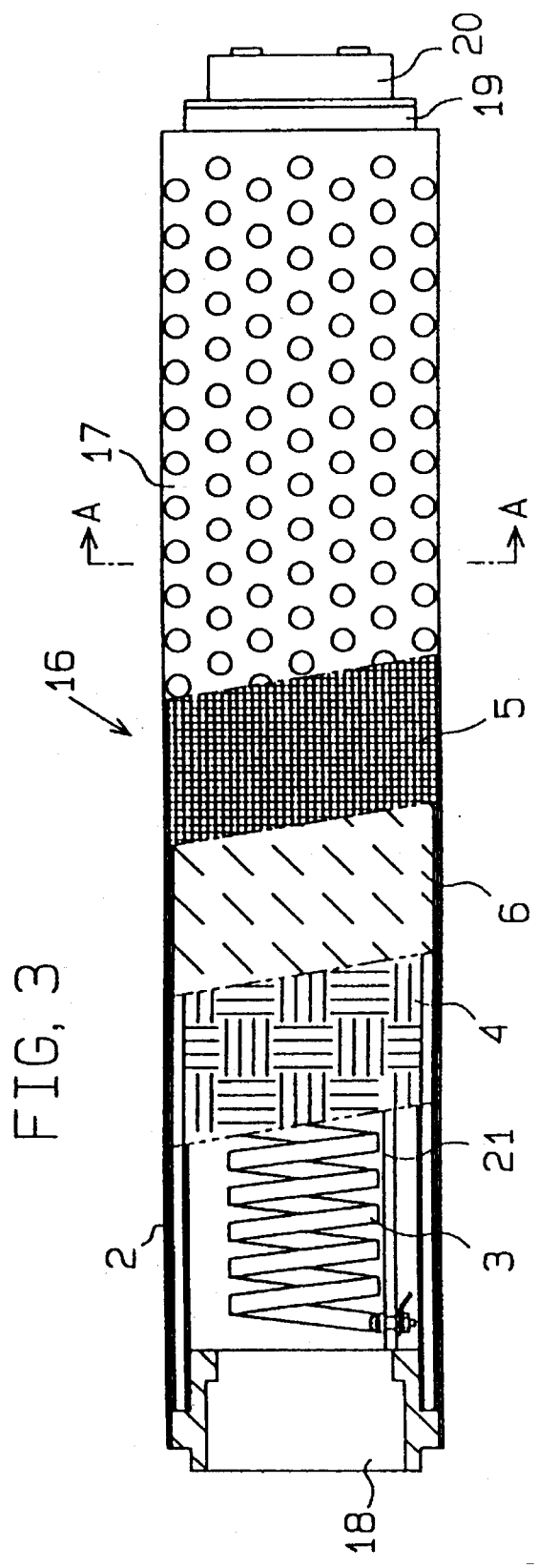
FIG. 3 is a schematic side view, with portions broken away, of a tubular filter according to a second embodiment.
Figure 4:
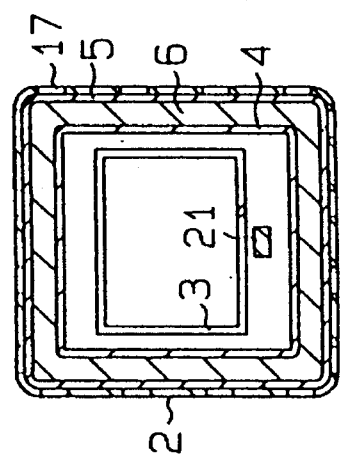
FIG. 4 is a schematic cross-sectional view taken along line A—A in FIG. 3.

The second embodiment will now be described with reference to FIGS. 3 through 5. This embodiment differs significantly from the first embodiment in that the filter is formed in a nearly rectangular tube. The filter body 2 of a tube filter 16 is so designed to have the second air-permeable partition 5, filter layer 6 and first air-permeable partition retained inside a rectangular tube body 17 made of a porous plate, with the heater 3 disposed inside. The porous plate is a stainless steel plate of a 1-mm thickness, and has a numerical aperture of 50%. Fixed metal fittings 18 and 19 having a shape of a rectangular tube and each having a collar are securely fitted at both ends of the rectangular tube body 17. The end portions of the first air-permeable partition 4, filter layer 6 and second air-permeable partition 5 are securely fitted in order from the inner side to the outer surfaces of both fixed metal fittings 18 and 19. A blocking member 20 is fastened to the fixed metal fitting 19. The heater 3 is constituted of ribbon-shaped canthal lines formed in a spiral form along the surfaces of the rectangular tube, and is secured to a support bar 21 that is fixed in an overhanging fashion to the blocking member 20. The heater 3 is connected to a power line led inside the first air-permeable partition 4 from an inlet portion (not shown)

provided in the blocking member 20. The first air-permeable partition 4 is formed of a plain, cylindrical fabric which was produced using the same Altex fibers as used in the first embodiment. The cylindrical fabric is produced according to the manufacturing method for a three-dimensional fabric disclosed in U.S. Pat. No. 5,091,246. The filter layer 6 is formed of the same Kaowool as used in the first embodiment, and the second air-permeable partition 5 is formed into a rectangular tube of a fine-mesh woven metal wire having a plain structure of stainless steel wires. Then, by fitting both ends of the cylindrical fabric to the fixed metal fittings 18 and 19 and arranging the filter layer 6 and the second air-permeable partition 5 around it, the first air-permeable partition 4 and the filter layer 6 form a rectangular tube.

Figure 5:
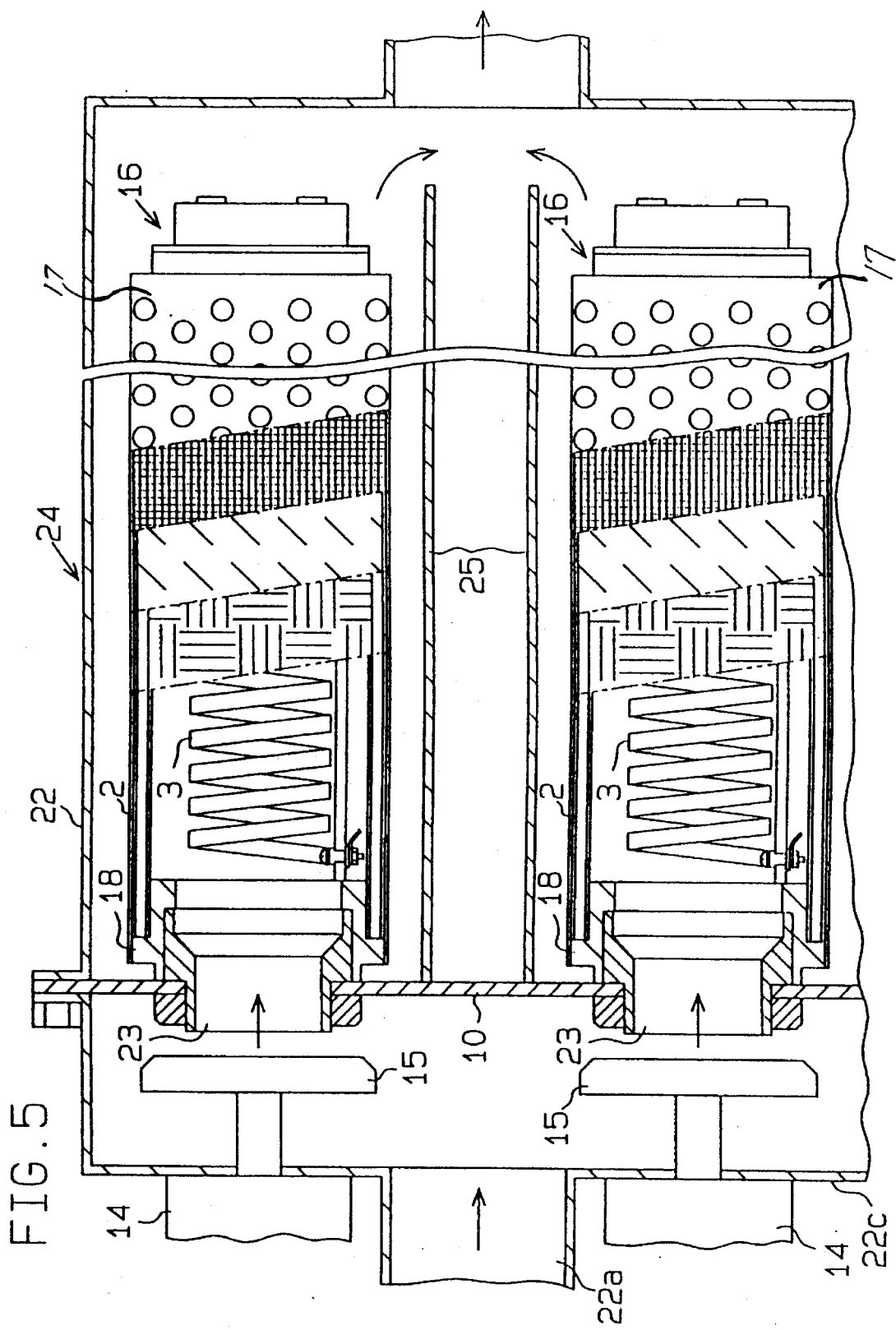
FIG. 5 is a schematic cross-sectional view of a filter apparatus having a multiplicity of tubular filters according to the second embodiment.

As shown in FIG. 5, six filter bodies 2 (only parts shown) were mounted in parallel to a partition 10 close to an inlet 22a of a housing 22 through support tubes 23, constituting a filter apparatus 24. The filter bodies 2 are secured by fitting the fixed metal fittings 18 to the support tubes 23. Actuators 14 with lids 15 for opening and closing the opening portions of the support tubes 23 are attached to an inlet side wall 22c of the housing 22 which face the individual support tubes 23. A metal partition 25 is disposed outside the rectangular tube body 17.

In use, this filter apparatus 24 was coupled to that position of the exhaust pipe of a Diesel engine which is set apart about 2 m from the engine exhaust port, so that the exhaust gas would flow in through the inlet side. When the back pressure reached a given level, the introduction of the exhaust gas to one filter body 2 was blocked and the associated heater 3 was energized. After the deposited particulate was burned, the introduction of the exhaust gas to this filter body 2 was started again, and the exhaust gas processing was continued using all the six filter bodies, and this was carried out in order for each of the filter bodies 2, thus ensuring continuous stable exhaust gas processing.

The particulate trapping ratio with a displacement of 3000 cc, an engine speed of 1600 rpm and a 50% load, was high as much as 84 to 88%, the back pressure level could be suppressed to 110 mmHg or lower, and a smooth operation was possible. As the driving under such conditions was conducted for an equivalent running distance of 30,000 km, damages inside the non-woven fabric were not detected and no scattering of the fibers was substantially detected.

When the filter apparatus 24 was constituted without providing the first air-permeable partition 4 so that the exhaust gas would hit against the filter layer 6 directly and the exhaust gas processing was conducted, the non-woven fabric was soon destroyed and became ragged, and the particulate trapping ratio dropped quickly and the filtering function failed. When a cylindrical fabric of the same type of ceramic fibers as used for the first air-permeable partition 4 was used as the second air-permeable partition 5 in place of the woven metal wire, and a similar test was conducted. The result was that while no change in trapping ratio and no damages on the non-woven fabric were noticed, the back pressure become slightly high.

In the apparatus of this embodiment, as the heater 3 is disposed inside the filter body 2, the heat generated by the heater 3 is mostly transmitted to the deposits and the filter body 2 at the time the filter body 2 is reconditioned. Further, as the first air-permeable partition 4 and filter layer 6 serve as heat insulators, the deposits will be burned efficiently, reducing the consumed power.

As the partition 25 is located outside each filter body 2, at the time of burning the deposited particulate, the flow of the exhaust gas which passed through the adjoining filter bodies 2 hardly affected the filter bodies 2 during reconditioning, the heat insulating effect of the filter bodies during burning was surely maintained, and a stable burning/reconditioning was conducted.

Furthermore, the first air-permeable partition 4 is constituted of a cylindrical fabric and has no seam. Even if excessive stress is applied to the filter member for some reason, therefore, it is unlikely to raise a problem that a specific portion (seam portion) is broken to destroy the unwoven fabric and the particulate pass the filter untrapped.

(Embodiment 3)

The third embodiment will now be described referring to FIGS. 6 and 7. This embodiments differs in that the lateral cross section of the tubular filter 16 is formed into a nearly rectangular shape, and that a metal cover tube 26 is securely fitted to the outside the rectangular tube body 17 with a certain clearance therewith, as indicated by the chain line in FIG. 7. The cover tube 26 has the same function as the metal partition 25 in the second embodiment. That is, with a plurality of tubular filters 16 assembled in a single housing 22 to constitute the filter apparatus 24, when deposits are burned at one tubular filter 16, the cover tube 26 serves to prevent the exhaust gas processed by the other tubular filters 16 from adversely affecting the burning process.

Figure 6:
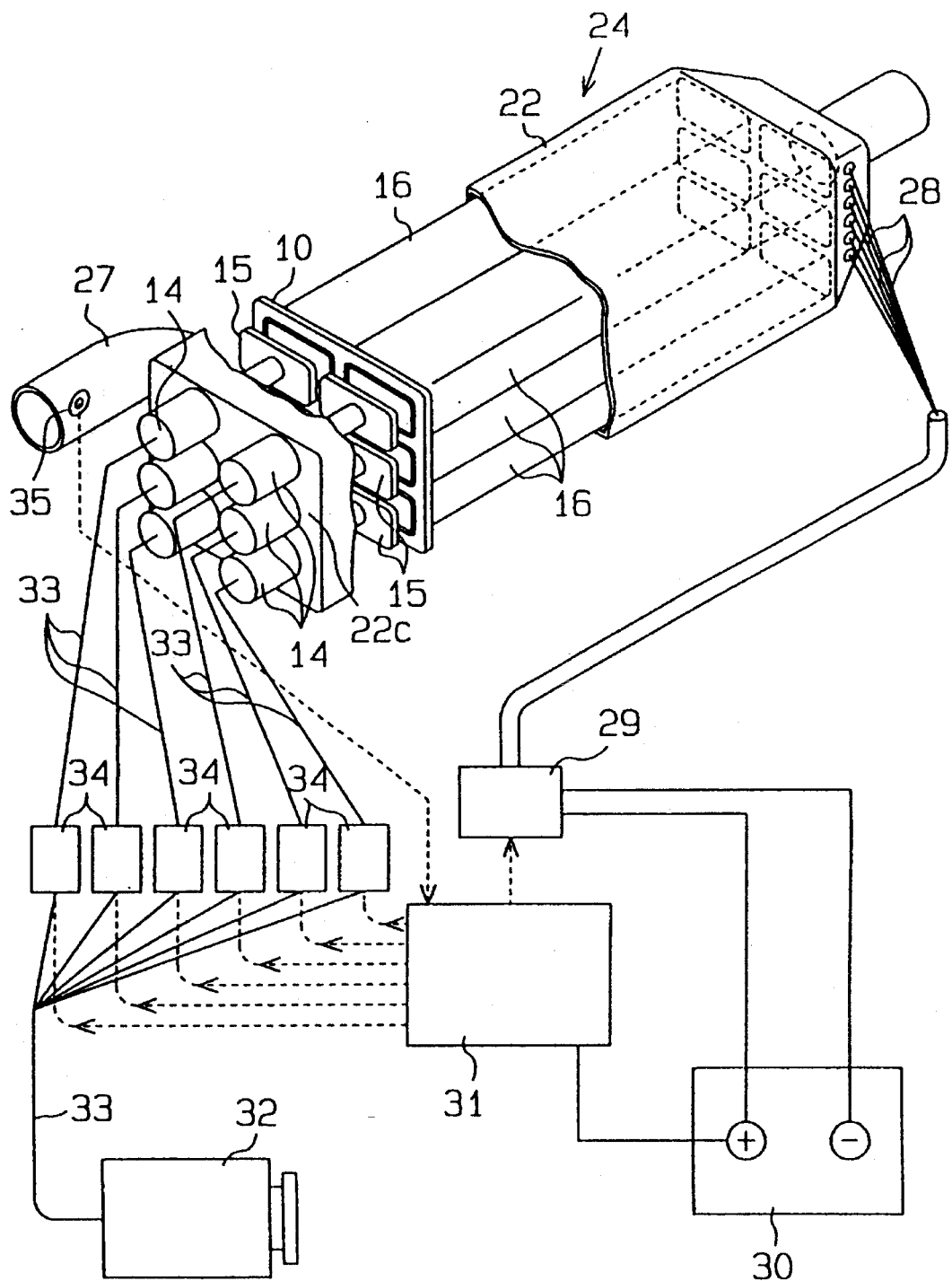
FIG. 6 is a schematic diagram, with portions broken away, of a filter apparatus according to a third embodiment.
Figure 7:
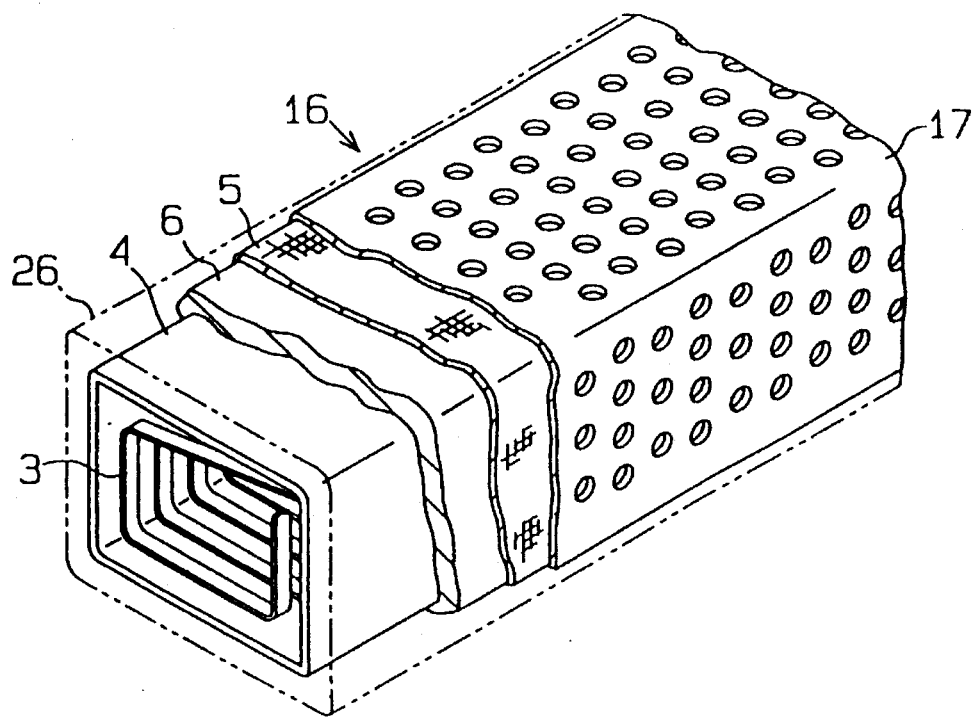
FIG. 7 is a schematic perspective view, with portions broken away, of a tubular filter in the embodiment of FIG. 6.

The tubular filters 16 are disposed in the housing 22 in three stages and two rows as shown in FIG. 6, with the tubular covers 26 in contact with one another, thereby constituting the filter apparatus 24. The actuators 14 are attached to an inlet side wall 22c of the housing 22 at the position facing the respective tubular filters 16. An exhaust gas inlet pipe 27 is disposed in such a way as to be coupled to the housing 22 in the space between the wall 22c and the partition 10. Power lines 28 connected to the individual heaters 3 are connected via a heater relay 29 to a battery 30. The opening/closing of the heater relay 29 is controlled by a controller 31 so that with the heater relay 29 closed, the heaters 3 are energized.

The actuators 14 are connected via tubular paths 33 to a vacuum pump 32 as a negative pressure source, and a valve 34 is provided midway in each tubular path 33. The valves 34 are electrically connected to the controller 31, and serve to switch the tubular paths 33 connected to the respective actuators 14 between a state to be coupled to the vacuum pump 32 that is normally mounted in a Diesel engine car, and a state to be communicate with the outside air, in response to an instruction from the controller 31. The exhaust gas inlet pipe 27 is provided with a pressure sensor 35 for detecting the pressure of the exhaust gas that is led into. The pressure sensor 35 is electrically connected to the controller 31. The controller 31 is designed to control the timing of energizing the heaters 3 based on a detection signal from the pressure sensor 35.

The valves 34 are normally held in a state to connect the tubular paths 33 connected to the individual actuators 14 to the outside air, and lids 15 are arranged at the positions to open the opening portions of the individual tubular filters 16. The pressure (back pressure) in the exhaust gas inlet pipe 27 rises in accordance with an increase in the amount of particulate trapped by the tubular filters 16. The controller 31 detects the pressure in the exhaust gas inlet pipe 27 based on the detection signal from the pressure sensor 35. When the pressure in the exhaust gas inlet pipe 27 reaches a predetermined level, the controller 31 activates the actuator 14 of one tubular filter 16 to close its opening portion. Then, the controller 31 energizes the associated heater 3 to generate heat via the heater relay 29, and stops the energization and moves the lid 15 to the open position to start the introduction of the exhaust gas into the associated tubular filter 16 again after the energization continues for a predetermined time. Thereafter, the controller 31 reconditions the tubular filters 16 one by one based on the detection signal from the pressure sensor 35.

(Embodiment 4)

Figure 8:
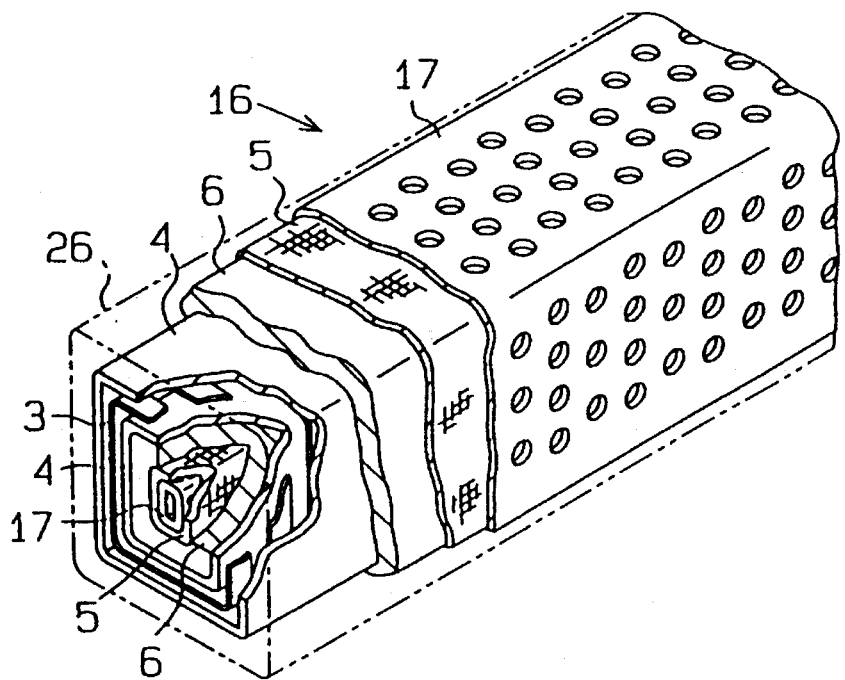
FIG. 8 is a schematic perspective view, with portions broken away, of a tubular filter according to a fourth embodiment.

The fourth embodiment will now be described referring to FIGS. 8 through 10. This embodiment differs significantly from the above-described embodiments in that one tubular filter 16 has two filter bodies 2a and 2b arranged concentrical to each other. The first filter body 2a located outward has the second air-permeable partition 5, filter layer 6 and first air-permeable partition 4 disposed inside the rectangular tube body 17, made of a porous plate, in order from the outer side. The second filter body 2b, located inward, has the second air-permeable partition 5, filter layer 6 and first air-permeable partition 4 disposed outside the rectangular tube body 17, made of a porous plate, in order from the inner side. That is, the first air-permeable partitions 4 of both filter bodies 2a and 2b are arranged to face each other with a predetermined interval therebetween. The heater 3 is disposed between both first air-permeable partitions 4.

Figure 9:
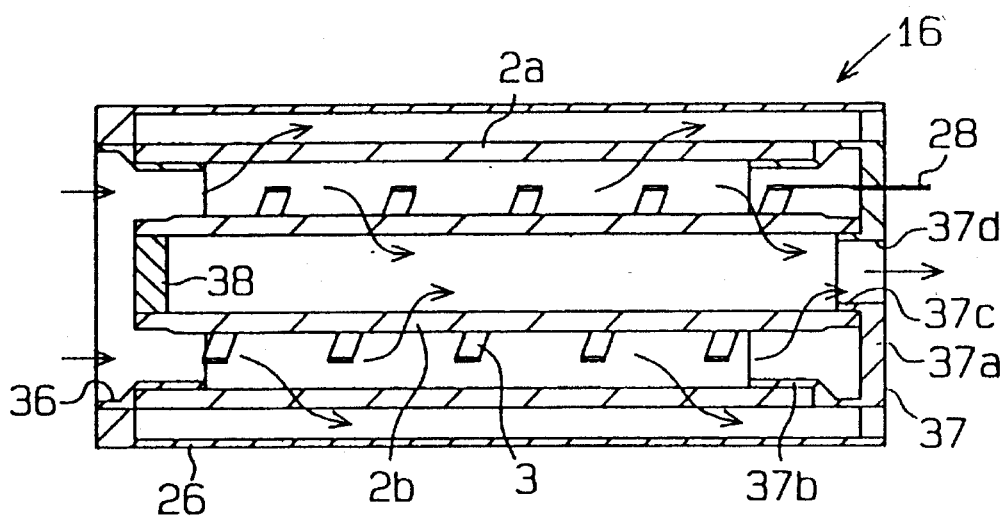
FIG. 9 is a schematic vertical cross-sectional view of the tubular filter of FIG. 8.

As shown in FIG. 9, both filter bodies 2a and 2b are arranged between a fixed metal fitting 36 of a rectangular tube shape and a fixed metal fitting 37 having two tube portions 37b and 37c concentrically protruding from a base plate 37a. A hole 37d is formed in the base plate 37a inward of the tube portion 37c. The first filter body 2a has its first end portion securely fitted on the outer surface of the fixed metal fitting 36 and its second end portion securely fitted on the outer surface of the tube portion 37b. The second filter body 2b has its first end portion inserted inside the fixed metal fitting 36 and its second end portion securely fitted on the outer surface of the tube portion 37c and supported in an overhanging fashion. A blocking member 38 is securely fitted to the inner side of the first end portion of the second filter body 2b. The rectangular cover tube 26 is provided with a predetermined interval outside the first filter body 2a. The cover tube 26 is attached in such a way that its first end portion is securely fitted on the outer surface of the fixed metal fitting 36 and a rib formed at the second end portion is in contact with the outer surface of the fixed metal fitting 37. The structure for supporting the second filter body 2b in an overhanging fashion may be replaced with a structure of protrusively providing a rib on the inner wall of the fixed metal fitting 36 and supporting the first end portion of the second filter body 2b with the fixed metal fitting 36.

The heater 3 is constituted of ribbon-shaped canthal lines formed in a spiral form along the clearance between both rectangular tubes, and is secured to a support bar (not shown) that is fixed in an overhanging fashion to the fixed metal fitting 37. The heater 3 is connected to the power lines 28 led inside from an inlet portion (not shown) provided in the fixed metal fitting 37.

This tubular filter 16 is used under the condition that the exhaust gas is introduced from the side of the fixed metal fitting 36. The exhaust gas introduced in the tubular filter 16 is guided between both filter bodies 2a and 2b, and passes through the first filter body 2a from inside to outside while the exhaust gas passes through the second filter body 2b from outside to inside. The exhaust gas having passed the first filter body 2a moves toward the outlet, passing between the outer surface of the first filter body 2a and the cover tube 26, while the exhaust gas having passed the second filter body 2b moves toward the outlet, passing inside the second filter body 2b.

When the heater 3 is energized with some amount of particulate deposited on the tubular filter 16, the particulate deposited on both filter bodies 2a and 2b are burned at the same time. As the filter bodies 2a and 2b are arranged in an overlapping fashion, the heat insulating effect is excellent and the heat of burning the particulate deposited on the filter body 2b, located inside, is utilized effectively. As a result, the consumed power with respect to the filtering area necessary for burning is reduced.

Figure 10:
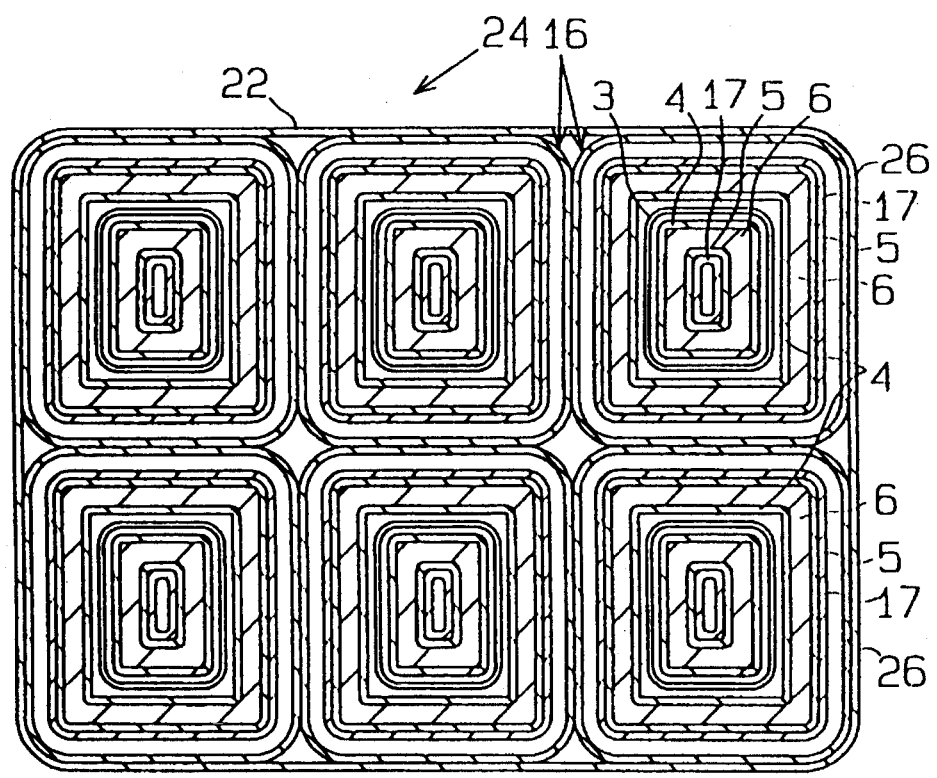
FIG. 10 is a schematic horizontal cross-sectional view of a filter apparatus having many tubular filters of the type shown in FIGS. 8 and 9.

As shown in FIG. 10, the tubular filters 16 are accommodated in the housing 22 with their cover tubes 26 contacting with one another, constituting the filter apparatus 24. As both filter bodies 2a and 2b are arranged concentrically, the filtering area increases by that of the second filter body 2b, as compared with the type having one filter body 2, provided that the outside diameter of the tubular filter 16 is the same. The volume of the filter apparatus 24 will be reduced by a factor of three as compared with that of the filter apparatus 24 of the second embodiment, and the consumed power will be reduced also.

(Embodiment 5)

Figure 11:
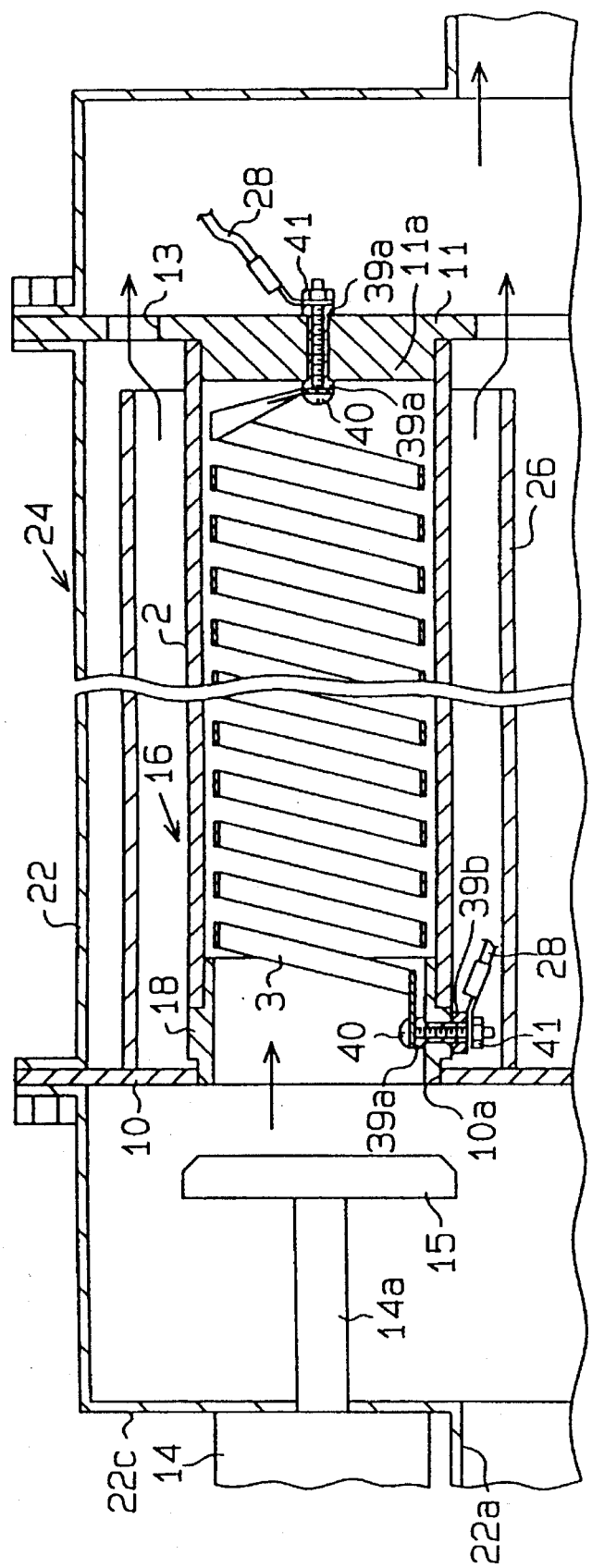
FIG. 11 is a schematic cross-sectional view, with portions broken away, of a filter apparatus according to a fifth embodiment.

The fifth embodiment will now be described referring to FIG. 11. This embodiment differs greatly from the second embodiment in that the tubular filter 16 is cylindrical, that the fixed metal fitting 18 is provided only at the first end portion of the filter body 2 and the manner of supporting the heater 3. The other structure is basically the same.

When in use, the tubular filter 16 has one end closed by a blocking member so that the exhaust gas is introduced inside from the side of the fixed metal fitting 18. In the case where the filter apparatus 24 is constituted by assembling a plurality of tubular filters 16 inside the housing 22, a pair of partitions 10 and 11 are disposed inside the housing 22. The tubular filters 16 are arranged between both partitions 10 and 11, with the fixed metal fittings 18 fitted in holes 10a formed in the inlet side partition 10 and the second end portions of the filter bodies 2 fitted on a projection 11a formed on the outlet side partition 11. The projection 11a serves as a blocking member for closing the second end portion of the tubular filter 16 and a fixed metal fitting for the heater 3. Through holes are formed in the fixed metal fitting 18 and the projection 11a, with insulators 39a inserted in the through holes. The ends of the heater 3 are secured to the fixed metal fitting 18 and the projection 11a while being connected to the power lines 28 by screws 40, which are to be inserted in the insulators 39a and 39b and nuts 41, which are to be fastened on the screws 40.

(Embodiment 6)

Figure 12:
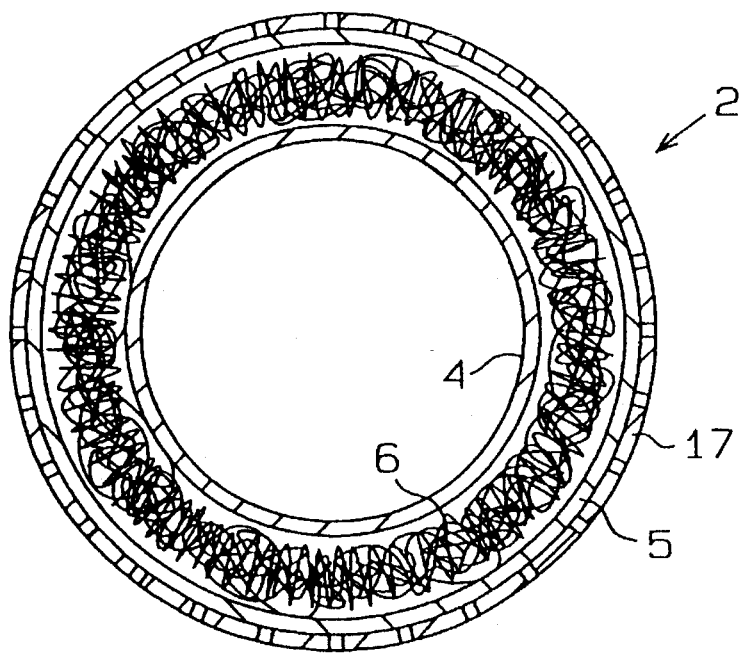
FIG. 12 is an exemplary cross-sectional view of a filter body 2 according to a sixth embodiment.

The sixth embodiment will now be described referring to FIG. 12. This embodiment differs from the above-described embodiments in the structure of the filter layer 6 of the filter body 2 which constitutes the tubular filter 16. More specifically, the filter layer 6 is constituted of a nonwoven fabric formed of short heat-resistant fibers in the above individual embodiments, whereas the filter layer 6 is provided by opening ceramic long fibers and stacking them in a mat form in this embodiment. According to the structure of this embodiment, therefore, flocks of fibers are generated less from the filter layer. The shape of the filter body 2 may be a rectangular tube, or may be applied to the flat filter 1.

As a method of opening ceramic long fibers and stacking them in a mat form, for example, ceramic long fibers are squirted from a thin nozzle together with a high-speed jet stream to hit against a plate having many gentle projections inclining forward, so that the fibers are stacked on the front air-permeable surface while being diffused. As another method, ceramic long fibers are gushed out from a thin nozzle together with a high-speed jet stream to directly stack onto a fine-mesh woven metal wire that becomes the second air-permeable partition 5.

In this case, to disperse fibers evenly as much as possible, it is desirable that the ceramic fibers have a smaller diameter and a finishing agent on the ceramic fibers have as small a converging effect as possible. In some cases, it is also effective to provide a heating zone on a yarn traveling passage or use hot air as a jet stream in order to eliminate the finishing agent.

Figure 13:
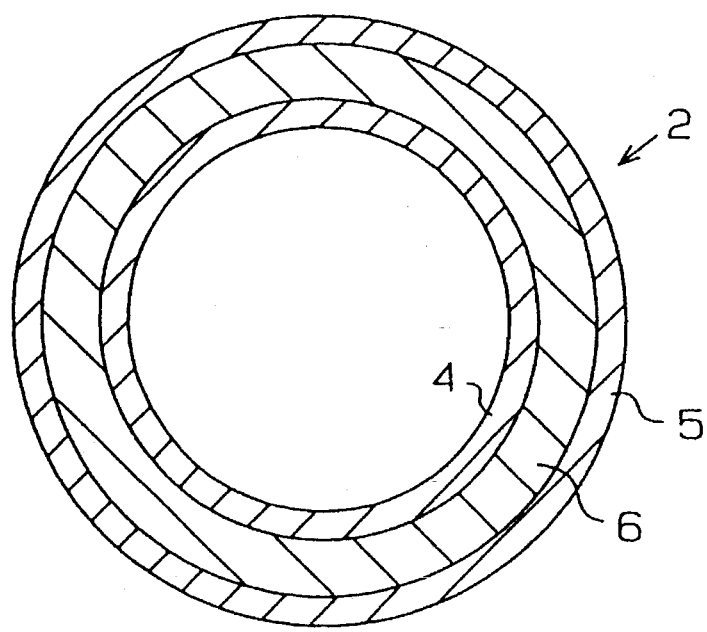
FIG. 13 is an exemplary cross-sectional view of a filter body 2 according to a modification.

The present invention is not limited to the above-described embodiments. For instance, as shown in FIG. 13, the second air-permeable partition 5 of filter body 2 of a tube shape may be constituted of a cylindrical fabric instead of a woven metal wire, or the porous plate arranged outside the second air-permeable partition 5 may be omitted. The first air-permeable partition 4 constituting the tubular filter 16 is not limited to the aforementioned cylindrical fabric woven by a three-dimensional loom, but may be the one that is produced by a braiding machine or a circular loom. However, the fabric woven by the three-dimensional loom is preferable in that fibers are less damaged and the fabric density can be increased. What is produced by a braiding machine or a circular loom may also be used as the second air-permeable partition 5.

Figure 14:
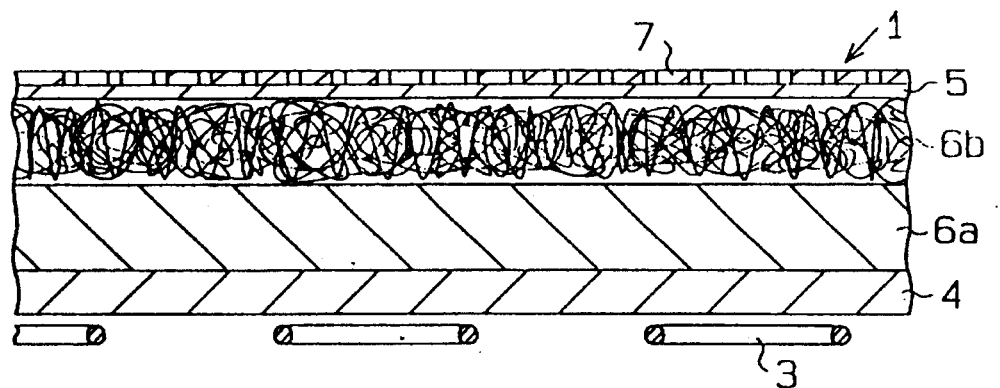
FIG. 14 is an exemplary cross-sectional view of a flat filter according to a modification.

Further, as the filter layer 6, instead of a nonwoven fabric constituted by ceramic short fibers entangled by a needle punch system, various fabrics may be used, such as a paper like nonwoven fabric provided by arranging ceramic short fibers, which are prepared by cutting ceramic long fibers to a proper length or the like, at random and bonding them together by a binder. As shown in FIG. 14, the filter layer 6 may be designed to have a double-layer structure having a filter layer 6a of a nonwoven fabric formed of ceramic short fibers, and a filter layer 6b of a nonwoven fabric formed by opening and filling ceramic long fibers. In this case, if the filter layer 6b is disposed on that side of the second air-permeable partition 5, short fibers coming off from the filter layer 6a would be caught by the filter layer 6b, and are prevented from flowing outside. The tubular filter 16 may be provided with a plurality of filter layers 6a and 6b.

Figure 15:
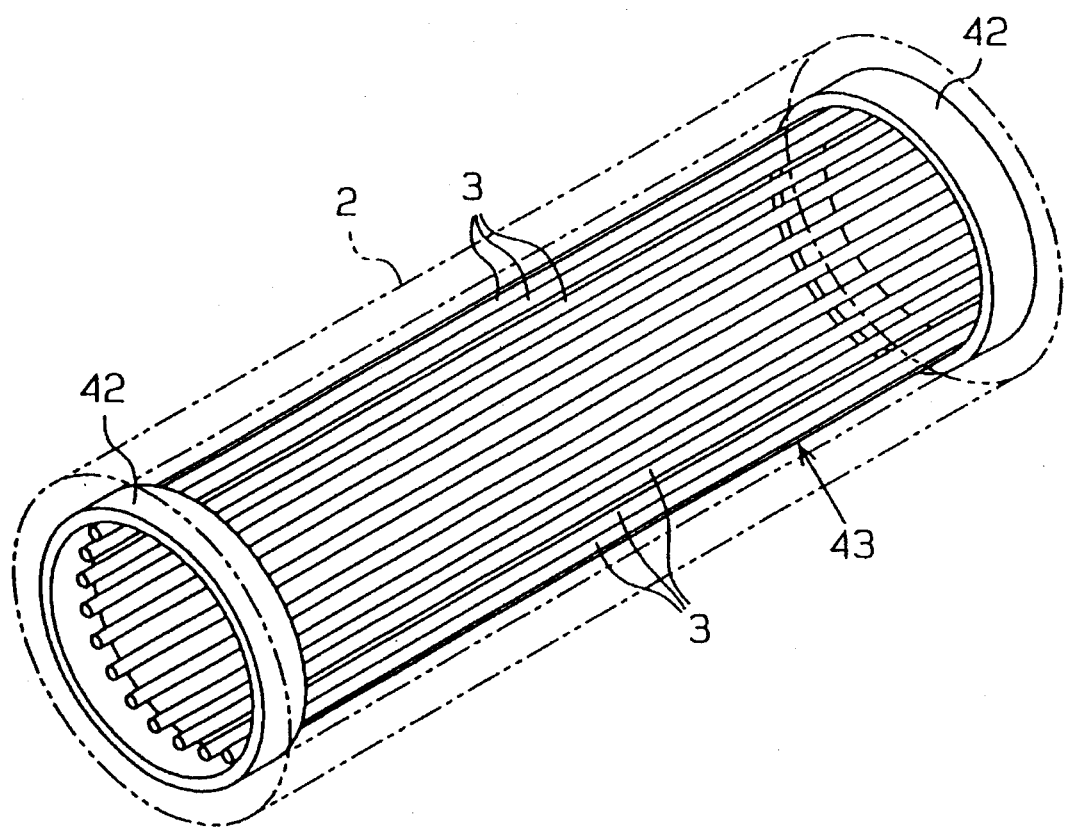
FIG. 15 is a schematic perspective view showing a heater unit.

In addition, as shown in FIG. 15, a heater unit 43 having many line heaters 3 secured in parallel between a pair of ring shaped fixed metal fittings 42 may be formed and may be attached by fitting the fixed metal fittings 42 in the tubular filter body 2. In this case, the heaters 3 may be coupled to one another at a plurality of midpoints of the individual heaters 3 by ceramic ring-shaped members, thereby preventing the line heaters 3 from contacting one another at the time the heaters 3 generate heat. In the case of the filter body 2 of a rectangular tube shape, the fixed metal fitting 42 is to be shaped in a rectangular ring. The heater unit 43 may be formed by securing line or ribbon-shaped heaters 3, formed in a spiral shape, between a pair of fixed metal fittings 42. The heater 3 should not necessarily be arranged separate from the filter body 2, but the heater 3 and filter body 2 may be arranged in a light contact with each other as long as both are not integrally coupled. For example, the canthal lines are formed in a spiral having a diameter which is nearly equal to as or slightly larger than the inside diameter of the tubular filter body 2. And the canthal lines are placed inside the filter body 2 while being twisted in the spiral direction to reduce the virtual diameter. When the twisting is relieved after the insertion, the spiral increases so that the canthal lines are arranged partially in light contact with the inner wall of the filter body 2. As both are not mechanically coupled, when they are deformed due to thermal expansion or the like, they can freely move, so that the heat-resistant fibers constituting the filter body 2 will not be damaged.

Figure 16:
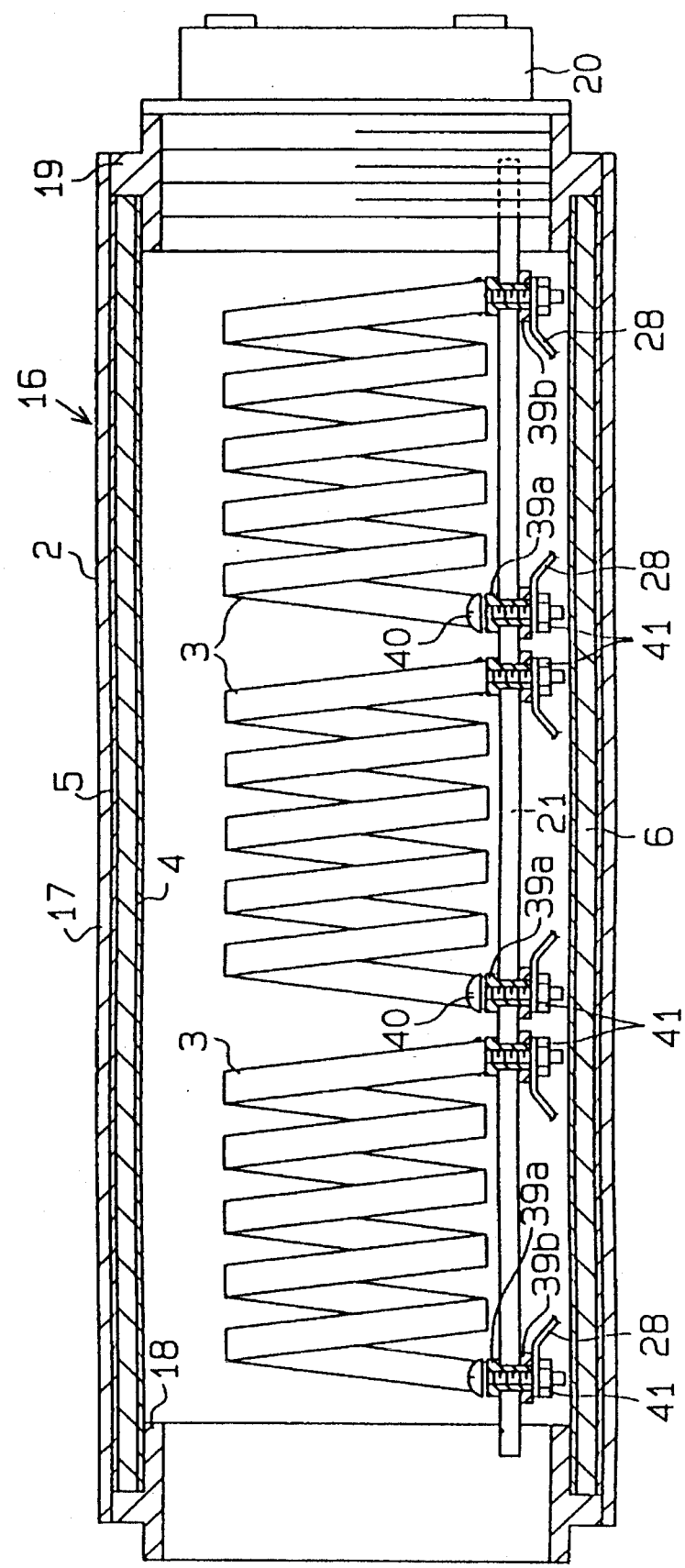
FIG. 16 is a schematic cross-sectional view of a tubular filter according to another modification.

Further, as shown in FIG. 16, the heater 3 to be attached to the tubular filter 16 may be separated into a plurality of heaters (three in the diagram) along the lengthwise direction of the tubular filter 16 so that the individual heaters 3 can be energized independently. In this case, at the time of energizing the heaters 3, the individual heaters 3 are not energized simultaneously, but the heater 3 close to the fixed metal fitting 18 is energized first. Then, the particulate in the area corresponding to this heater 3 are heated to the burning temperature to be burned by the heat generated by the heater 3. After a predetermined time necessary for burning the particulate at the location corresponding to that heater 3 passes, the energization is switched to the next heater 3. In this manner, the heat generating area is successively shifted to the adjoining section, thereby reconditioning the tubular filter 16.

Since the area of that section which should be heated by each heater 3 is small at the time of reconditioning the tubular filter 16, this section will be heated to the high temperature necessary for burning the particulate even if a small current is supplied to the heater 3. Further, the burning heat from the already burnt section is utilized to burn the next section, thus reducing the current in use. That is, at the time of reconditioning the tubular filter 16, a small amount of current is successively supplied to the individual heaters 3, allowing the particulate to be surely burned step by step.

When a battery is used as a power source, therefore, an excess load will not be frequently applied to the battery, ensuring its continuous usage over a long period of time.

In a filter apparatus having many flat filters 1 or tubular filters 16 assembled in a single housing, a fin may be provided in the space between the inlet of the housing and the partition to guide a fluid, introduced inside the housing from the inlet of the housing, toward holes formed in the individual partitions or the opening portions of the tubular filters 16. As the inlet side diameter of the housing is smaller than that at the portion where the filters are disposed, if there is nothing lying between the inlet and the location of the filters, the fluid tends to concentrate mostly on that filter which is located closer to the inlet of the housing, and this filter tends to have the largest amount of deposits. When the aforementioned fin is provided, however, the fluid introduced inside the housing will not concentrate on the filter near the inlet but evenly flow through the sections corresponding to all the filters, so that all the filters will function effectively, thus improving the persistence of the filtering effect.

In a filter apparatus having many tubular filters 16 assembled in a single housing 22, the tubular filters 16 may be reconditioned more than one at a time, instead of reconditioning the tubular filters 16 one by one. In a filter apparatus having many tubular filters 16, to set the timing for starting the reconditioning of each tubular filter 16, instead of setting it based on the back pressure detected by the pressure sensor 35, the reconditioning start timing may be treated as the time when the multiplication of the engine speed, obtained by the controller 31, reaches a predetermined multiplied value. The temperature of the exhaust gas inlet portion may be detected by a temperature sensor, so that when it is high, the set value of the multiplied engine speed is set low. In this case, the engine speed and a load are considered, so that the reconditioning start timing can be set to a more appropriate timing.

Further, this invention is not limited to an exhaust gas filter apparatus for a Diesel engine of an automobile, but may be adapted to filter apparatuses for other Diesel engines or other fluid filter apparatuses.

INDUSTRIAL APPLICABILITY

As described above, a heat-resistant filter according to this invention is effective to filter the exhaust gas of a diesel engine.

We claim:

1. A heat-resistant filter for use in an exhaust gas passage in communication with an engine to collect particulate contained in exhaust gas, said filter comprising:

a filter layer of randomly disposed heat-resistant fibers; and first and second air-permeable partitions facing each other with said filter layer therebetween;

said first partition being disposed relative to the second partition for location upstream of the latter when the filter is installed in the exhaust gas passage, and wherein said first partition includes a planar fabric made of electrically non-conductive heat-resistant fibers.

2. A heat-resistant filter according to claim 1, wherein both said air-permeable partitions are formed in a tube shape and arranged concentric to each other.

3. A heat-resistant filter according to claim 2, wherein both said air-permeable partitions have a rectangular shape in cross section.

4. A heat-resistant filter according to claim 1, further comprising an electrical heat-generating member disposed close to and along said first partition.

5. A heat-resistant filter according to claim 4, wherein said second air-permeable partition is formed of a woven metal wire.

6. A heat-resistant filter according to claim 5, further comprising a porous plate disposed relative to the second partition for location downstream of the second partition when the filter is installed in the exhaust gas passage.

7. A heat-resistant filter according to claim 4, wherein said filter has a body formed in a tube shape encircling the first air-permeable partition.

8. A heat-resistant filter according to claim 7, wherein said second air-permeable partition is formed of a woven metal wire.

9. A heat-resistant filter according to claim 8, wherein said tube body is formed of a porous plate disposed relative to the second air permeable partition for location downstream of the latter when the filter is installed in the exhaust gas passage.

10. A heat-resistant filter according to claim 9, further including a cover tube arranged outside the filter body.

11. A heat-resistant filter according to claim 4, wherein said filter has a body formed in a rectangular tube shape.

12. A heat-resistant filter for use in an exhaust gas passage in communication with an engine to collect particulate contained in exhaust gas, said filter comprising:

a filter layer of randomly disposed heat-resistant fibers; and first and second air-permeable partitions formed in a tube shape and concentrically disposed facing each other with said filter layer therebetween;

said first partition being disposed relative to the second partition for location upstream of the latter when the filter is installed in the exhaust gas passage, wherein said first partition includes a planar fabric made of electrically non-conductive heat-resistant fibers.

13. A heat-resistant filter according to claim 12 further comprising an electrical heat-generating member disposed close to and along said first partition.

14. A heat-resistant filter according to claim 13, wherein said second air-permeable partition is formed of a woven metal wire.

15. A heat-resistant filter according to claim 14, further comprising a porous plate disposed relative to the second partition for location downstream of the second partition when the latter is installed in the exhaust gas passage.

16. A heat-resistant filter according to claim 14, wherein said filter has a body formed in a tube shape encircling the first air-permeable partition.

17. A heat-resistant filter according to claim 16, wherein said second air-permeable partition is formed of a woven metal wire.

18. A heat-resistant filter according to claim 17, wherein said tube body is formed of a porous plate disposed relative to the second air permeable partition for location downstream of the latter when the filter is installed in the exhaust gas passage.

19. A heat-resistant filter according to claim 18, further including a cover tube arranged outside the filter body.

20. A heat-resistant filter for use in an exhaust gas passage in communication with an engine to collect particulate contained in exhaust gas, said filter comprising:

a filter layer of randomly disposed heat-resistant fibers;

a filter body having first and second air-permeable partitions formed in a tube shape and concentrically disposed facing each other with said filter layer therebetween;

said first air-permeable partition being disposed relative to said second partition for location upstream of the latter when the filter is installed in said exhaust gas passage, and wherein said first partition includes a planar fabric made of electrically non-conductive heat resistant fibers;

said second air-permeable partition being formed of a woven metal wire; and an electrical heat-generating member disposed close to and along said first partition.

* * * * *